United States Patent
Vodicka

[19]

[11] Patent Number: 6,126,151
[45] Date of Patent: Oct. 3, 2000

[54] HYBRID COOLING PLANT

[75] Inventor: Vladimir Vodicka, Bochum, Germany

[73] Assignee: GEA Energietechnik GmbH, Bochum, Germany

[21] Appl. No.: 09/291,077

[22] Filed: Apr. 14, 1999

[30] Foreign Application Priority Data

Apr. 28, 1998 [DE] Germany .............................. 198 18 922

[51] Int. Cl.[7] .................................................. B01F 3/04
[52] U.S. Cl. .......................... 261/136; 261/138; 261/146; 261/147
[58] Field of Search .................................. 261/136, 138, 261/146, 147, 150

[56] References Cited

U.S. PATENT DOCUMENTS

| | | | |
|---|---|---|---|
| 1,261,047 | 4/1918 | MacFadden | 261/138 |
| 2,479,408 | 8/1949 | Richardson | 261/136 |
| 2,525,045 | 10/1950 | Richardson | 261/147 |
| 4,361,524 | 11/1982 | Howlett | 261/150 |

*Primary Examiner*—C. Scott Bushey
*Attorney, Agent, or Firm*—Friedrich Kueffner

[57] ABSTRACT

A hybrid cooling plant includes at least one sector with a dry cooling part connected to a feed pump and including at least two heat exchangers which are connected in parallel, and with a wet cooling part located underneath the dry cooling part, wherein the dry cooling part and the wet cooling part are connected to each other by a closed connection. The highest locations of the heat exchangers are connected through a deaerating line to a vacuum pump and the heat exchangers are provided with evacuating and ventilating valves and level limit switches. The deaerating lines of the heat exchangers of a sector which operationally form a unit are connected to a deaerating vessel or reservoir. A water draining line is connected to the deaerating vessel and the water draining line ends below the water level of a water collecting basin located lower than the heat exchangers, wherein the deaerating vessel is connectable to ambient air through a deaerating line with a deaerating valve integrated in the deaerating line, and wherein the deaerating vessel is connected to the vacuum pump through an evacuating line in which an evacuating valve is provided which is coupled to the level limit switches provided for the heat exchangers.

3 Claims, 1 Drawing Sheet

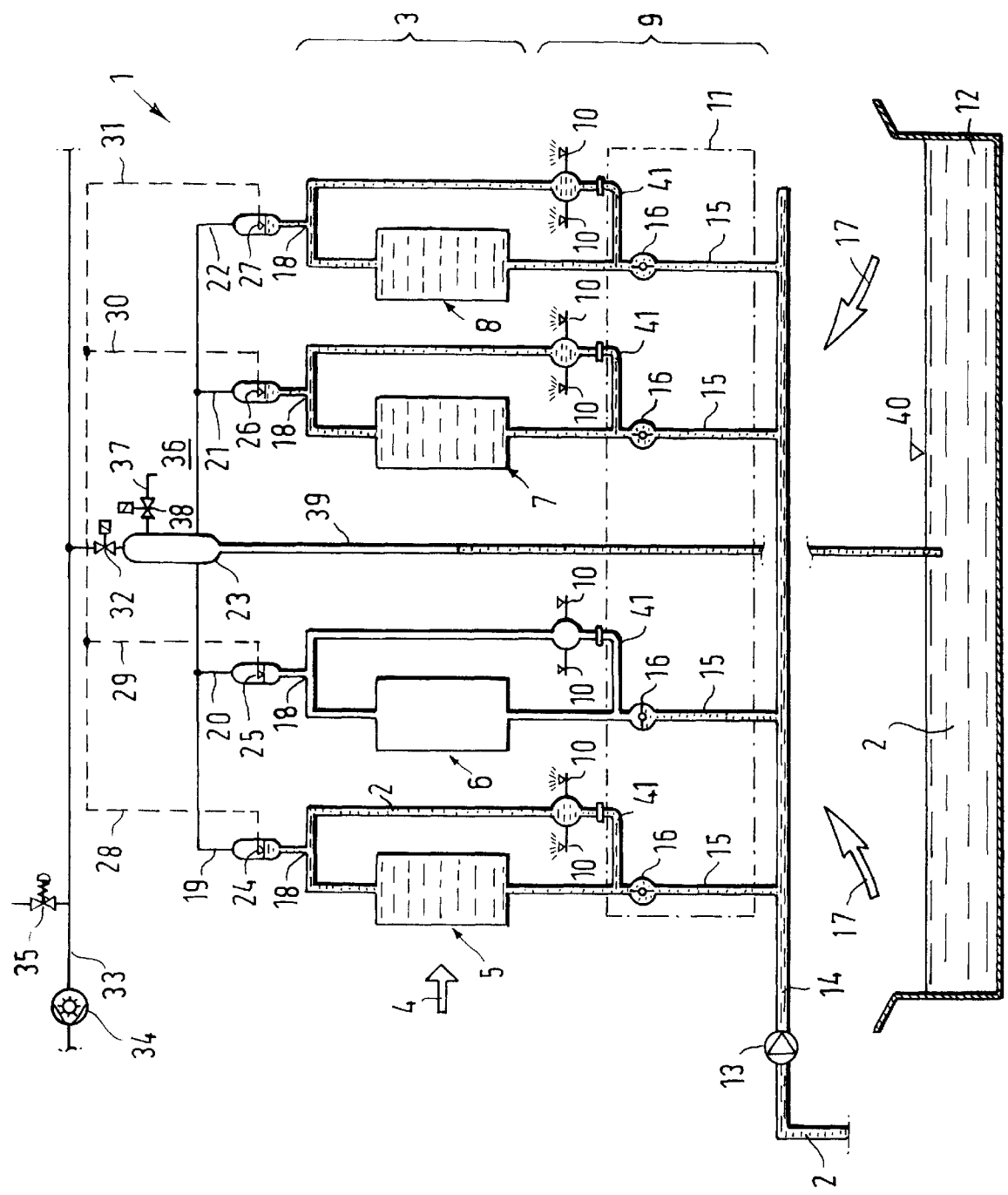

HYBRID COOLING PLANT

BACKGROUND OF THE INVENTION

1. Field of the Invention

The present invention relates to a hybrid cooling plant including at least one sector with a dry cooling part connected to a feed pump and including at least two heat exchangers which are connected in parallel, and with a wet cooling part located underneath the dry cooling part, wherein the dry cooling part and the wet cooling part are connected to each other by a closed connection or linkage, wherein the highest locations of the heat exchangers are connected through a deaerating line to a vacuum pump and the heat exchangers are provided with evacuating and ventilating valves and level limit switches.

2. Description of the Related Art

A hybrid cooling plant has at least one sector with a dry cooling part and a wet cooling part. Several sectors may be arranged in rows one behind the other in the form of individual hybrid cooling towers. These hybrid cooling towers usually have a rectangular cross-section in the horizontal direction. However, the sectors may also be components of a single hybrid cooling tower which has a round or polygonal cross-section in the horizontal direction. Independently of the fact whether the sectors are arranged in rows one behind the other or on a circle, it is usually the case that the water to be cooled is applied in parallel to all sectors.

Each sector is composed of a dry cooling part with at least two heat exchangers and a wet cooling part with dripping elements underneath the heat exchangers. Cooling air is supplied, if necessary forcibly, to the dry cooling part as well as to the wet cooling part. The water to be cooled is first conducted by means of a feed pump through the dry cooling part and is subsequently conducted through a closed connection to the wet cooling part in order to save pumping energy. From the wet cooling part, the cooled water drops into a water collection basin arranged underneath the wet cooling part.

For controlling the output especially of a hybrid cooling plant composed of several sectors or for maintenance or repair purposes, it is known in the art to temporarily switch off individual sectors, several heat exchangers of a sector or also individual heat exchangers; in other words, these elements are taken out of the cooling operation. When a hybrid cooling plant is first taken into operation, the feed pump which forces the water to be cooled into the hybrid cooling plant causes the water to be forced up to the highest locations of the heat exchangers; this is because of the operational characteristics of the feed pump and the fact that all heat exchangers are of equal construction; on the other hand, when the operation of a sector or heat exchanger which has been switched off is restarted, it is necessary to fill each of the switched-off heat exchangers again with water. For this purpose, a vacuum pump is used which produces a negative pressure. Such a vacuum pump is also required for maintaining the closed connection (siphon effect) between the dry cooling part and the wet cooling part. A common vacuum pump is required at least for all heat exchangers of the hybrid cooling plant. This vacuum pump is then connected through various deaerating lines to the highest locations of the heat exchanger, so that a complete deaeration is effected.

To ensure that, when the operation is restarted, the vacuum does not draw the water into the deaerating lines and becomes flooded, each heat exchanger is provided with suitable level limit switches and evacuating and ventilating valves. Since, in principle, each heat exchanger is provided with a level limit switch, an evacuating valve coupled to the level limit switch and a deaerating valve, this means that hybrid cooling plants with usually several sectors have a comparatively large number of valves. Added to this is the fact that expensive line mechanisms and the electronic remote control are required. This large amount of valves not only results in significant costs for procuring, connecting and maintaining the plant, but there is the additional danger that the entire evacuating plant will be inoperative when only a single valve fails.

SUMMARY OF THE INVENTION

Therefore, it is the primary object of the present invention, starting from the prior art discussed above, to provide a hybrid cooling plant which requires a significantly smaller number of valves and in which flooding of the vacuum pump can be eliminated.

In accordance with the present invention, the deaerating lines of the heat exchangers of a sector which operationally form a unit are connected to a deaerating vessel or reservoir, wherein the water draining line is connected to the deaerating vessel and the water draining line ends below the water level of a water collecting basin located lower than the heat exchangers, wherein the deaerating vessel is connectable to ambient air through a ventilating line with a ventilating valve integrated in the ventilating line, and wherein the deaerating vessel is connected to the vacuum pump through an evacuating line in which an evacuating valve is provided, which is coupled to the level limit switches provided for the heat exchangers.

Consequently, in accordance with the present invention, the deaerating lines connected to the highest locations of the heat exchangers of a sector operationally forming a unit are connected to a deaerating vessel located preferably centrally within the sector. The number of heat exchangers which operationally form a unit in a sector depends on the local conditions. The deaerating vessel is connected through a water draining line to a point underneath the water level of a water collecting basin located lower than the heat exchangers.

The water collecting basin in question may be, for example, the water collecting basin provided for the wet cooling part. The fact that the water draining line extends into the water is important in order to facilitate an evacuation of the entire system.

The water draining line preferably starts at the lowest point of the deaerating vessel. The deaerating lines connected to the highest point of the heat exchangers lead into the deaerating vessel above the connection of the water draining line to the deaerating vessel.

Connected to the upper area of the deaerating vessel is a single ventilating line into which a ventilating valve is integrated. The ventilating line is in connection with ambient air.

Also connected to the upper area of the deaerating vessel is a single evacuating line which leads to the vacuum pump and into which an evacuating valve is connected.

It is additionally significant within the framework of the invention that only one evacuating line, one ventilating line and one water draining line each is connected to the deaerating vessel which is arranged as centrally as possible.

This measure makes it now possible that the feed pump forces the water to be cooled through a locking member provided in a tie line between the feed line and the heat exchanger into the heat exchanger when, for example, one heat exchanger of several heat exchangers provided in a sector is once again taken into operation and after opening the locking member. In that case, the feed pump is supported by the vacuum pump and its operation point is maintained as a result. Since the water to be cooled which flows into the heat exchanger which has to be filled again is pulled after the water which because of the permanently running feed pump is forced into the other heat exchangers which are still in operation, the water which is drawn by means of the vacuum pump through the heat exchanger which is to be filled again and reaches the deaerating vessel through the deaerating line between this heat exchanger and the deaerating vessel, inevitably flows through the central deaerating line into the water collecting basin. Only when the level limit switch provided for the heat exchanger to be filled again determines that the heat exchanger has been properly filled, the control line between this level limit switch and the evacuating valve provides a signal to the evacuating valve, so that the evacuating valve is closed.

Even when the evacuating valve fails, the water continues to be drawn through the deaerating line into the deaerating vessel, however, the water flows off into the water collecting basin because the water level in the deaerating line is lower than in the heat exchanger. Flooding of the vacuum pump is excluded.

For switching off at least one heat exchanger, the vacuum existing at the highest point at each heat exchanger must be broken for emptying the heat exchanger. In this case, the ventilating valve integrated in the ventilating line is opened.

In accordance with a further development of the basic concept of the present invention, the geodetic height difference between the water level and the connecting point of the evacuating line at the deaerating vessel is greater than the maximum intake pressure of the vacuum pump expressed in meters water column. As a result of this feature, the water can be maintained in the water draining line always at a certain level. Consequently, it is always ensured that, even if the evacuating valve is damaged, particularly mechanically, so as to keep the valve in an open position, water cannot be pulled by the vacuum pump through the deaerating vessel and reach the vacuum pump.

In accordance with another feature of the present invention, a negative pressure limiting valve is integrated in the evacuating line between the evacuating valve and the vacuum pump. First of all, this negative pressure limiting valve has the purpose of increasing the service life of the vacuum pump. This is because, in actual practice, the vacuum pump is not switched on and off as required. Rather, the plant is generally operated with the vacuum pump permanently running. However, to prevent the vacuum pump from being subjected to cavitation influences, the negative pressure limiting valve ensures when the evacuating valve is closed that the vacuum pump can permanently take in and, in this manner, continuously maintains a certain negative pressure in the line portion between the evacuating valve and the vacuum pump.

Another purpose of the negative pressure limiting valve is to maintain the water in the water draining line always at a certain level. For this purpose, the negative pressure limiting valve is always adjusted to a controlled negative pressure in the evacuating line.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

The single FIGURE of the drawing is a schematic illustration of the hybrid cooling plant according to the present invention.

DESCRIPTION OF THE PREFERRED EMBODIMENTS

In the drawing, reference character 1 denotes a sector of a hybrid cooling plant, otherwise not illustrated in detail, composed of several sectors for cooling hot water 2.

The sector 1 includes a dry cooling part 3 with four heat exchangers 5, 6, 7, 8 to which cooling air 4 is admitted and a wet cooling part 9 located geodetically below the heat exchangers 5–8 and provided with a plurality of nozzle vessels 10. Dripping elements 11 are located underneath the nozzle vessels 10 and a water collecting basin 12 is arranged below the dripping elements 11.

The hot water 2 to be cooled is conveyed by means of a feed pump 13 through a feed line 14 and ascending lines 15 into the heat exchangers 5–8. The locking members 16 incorporated into the ascending lines 15 are switched to open. From the heat exchangers 5–8, the precooled water 2 reaches the wet cooling part 9 where the water is sprayed by means of the nozzle vessels 10 over the dripping elements 11 and comes there into a heat-exchanging contact with the cooling air 17. The cooled water then drops into the water collecting basin 12 and is conducted from there to other uses.

The highest points 18 of the heat exchangers 5–8 are connected through deaerating lines 19–22 to a deaerating vessel 23 centrally arranged in the sector 1. Level limit switches 24–27 are integrated in the deaerating lines 19–22, wherein the switches 24–27 are coupled through control lines 28–31 to an evacuating valve 32 which is incorporated in an evacuating line 33 which is connected to the upper area of the deaerating vessel 23. The evacuating line 33 leads to a vacuum pump 34. A negative pressure limiting valve 35 is connected to the length portion of the evacuating line 33 extending between the evacuating valve 32 and the vacuum pump 34.

Also connected to the upper area of the deaerating vessel 23 is a ventilating line 37 which is connected to ambient air 36. A ventilating valve 38 is integrated in the ventilating line 37.

Connected to the lowest point of the deaerating vessel 23 is a water draining line 39 which leads into the water collecting basin 12 to a point underneath of the water level 40 of the water 2.

Provided above the locking members 16 and between the nozzle vessels 10 and the ascending lines 15 are short circuit lines 41 which are provided with perforated plates, not illustrated in detail, for limiting the flow through the lines.

When the sector 1 is first taken into operation, the water 2 is forced by means of the feed pump 13 to the highest locations 18 of the heat exchangers 5–8 because of the operating characteristics of the feed pump 13 and the fact that all heat exchangers 5–8 are of the same construction. After the water has reached the highest locations, the water 2 drops into the geodetically lower wet cooling part 9 and causes additional water 2 to be drawn in. This means that the feed pump 13 only has to overcome the vertical distance between the feed pump 13 and the wet cooling part 9. Accordingly, the water 2 is forcibly drawn by the wet cooling part 9 out of the dry cooling part 3.

If maintenance operations are to be carried out, for example, on the heat exchanger 6, it is first necessary to close the locking member 16 in the ascending line 15 and subsequently to open the ventilating valve 38. This breaks the vacuum which prevails at the highest location 18 of the heat exchanger 6. The water 2 then flows from the heat exchanger 6 through the wet cooling part 9 into the water collecting basin 12. The short circuit line 41 reinforces the emptying process. As these measures are carried out, the feed pump 13 continues to run, so that the sector 1 remains in operation with the three other heat exchangers 5, 7 and 8. The vacuum pump 34 also continues to run. The evacuating valve 32 is closed. The negative pressure limiting valve 35 is adjusted in such a way that the vacuum pump 34 can permanently take in air and maintains the length portion of the evacuating line 33 between the evacuating valve 32 and the vacuum pump 34 at a certain negative pressure.

After the heat exchanger 6 has been emptied, the ventilating valve 38 is once again closed.

Once the maintenance operations on the heat exchangers 6 have been concluded and this heat exchanger 6 is to be once again taken into operation, initially the locking member 16 in the ascending line 15 is opened. Subsequently, the evacuating valve 32 is opened. The feed pump 13 then forces the water 2 through the ascending line 15 into the heat exchanger 6, wherein the output of the feed pump 13 is reinforced by the vacuum pump 34 and, thus the feed pump 13 is maintained at its operating point.

In addition, a portion of the water 2 is forced into the nozzle vessels 10 through the short circuit line 41, so that the nozzles are closed in an air-tight manner relative to the atmosphere. The vacuum pump 34 can then build up a negative pressure for supporting the feed pump 13.

Since the water 2 pumped into the heat exchanger 6 which has to be filled again is drawn from the wet cooling part 9 so as to follow the water 2 which is drawn from the wet cooling part 9 from the other three heat exchangers 5, 7 and 8, the water 2 which is additionally drawn into the heat exchanger 6 by means of the vacuum pump 34 and, thus, reaches the deaerating vessel 23 through the deaerating lines 20 and 19, subsequently flows in a forced manner through the water draining line 39 into the water collecting basin 12. Once the water 2 has reached the level limit switch 25 of the heat exchanger 6, a signal is given to the evacuating valve 32 and this evacuating valve 32 is closed.

The sector 1 is then once again completely filled.

While specific embodiments of the invention have been described in detail to illustrate the inventive principles, it will be understood that the invention may be embodied otherwise without departing from such principles.

I claim:

1. A hybrid cooling plant comprising at least one sector with a dry cooling part connected to a feed pump and including at least two heat exchangers which are connected in parallel, and with a wet cooling part located underneath the dry cooling part, wherein the dry cooling part and the wet cooling part are connected to each other by a closed connection, wherein highest locations of the heat exchangers are connected through deaerating lines to a vacuum pump and the heat exchangers are provided with evacuating and ventilating valves and level limit switches, wherein the deaerating lines of the heat exchangers of a sector which operationally form a unit are connected to a deaerating vessel, wherein a water draining line is connected to the deaerating vessel and the water draining line ends below a water level of a water collecting basin located lower than the heat exchangers, wherein the deaerating vessel is connectable to ambient air through a ventilating line with a ventilating valve integrated in the ventilating line, and wherein the deaerating vessel is connected to the vacuum pump through an evacuating line in which an evacuating valve is provided, and wherein the evacuating valve is coupled to the level limit switches provided for the heat exchangers.

2. The hybrid cooling plant according to claim 1, wherein a geodetic height difference between the water level and a connection point of the evacuating line at the deaerating vessel is greater than a maximum intake pressure of the vacuum pump expressed in meters water column.

3. The hybrid cooling plant according to claim 1, further comprising a negative pressure limiting valve connected in the evacuating line between the evacuating valve and the vacuum pump.

* * * * *